(12) United States Patent
Burch et al.

(10) Patent No.: US 7,315,739 B2
(45) Date of Patent: Jan. 1, 2008

(54) SYSTEMS AND METHODS FOR MEASUREMENT AND/OR CONTROL USING MOBILE PROBES

(75) Inventors: Jeff Burch, Palo Alto, CA (US);
Parvathi Chundi, Cupertino, CA (US);
John C. Eidson, Palo Alto, CA (US);
Bruce Hamilton, Menlo Park, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 736 days.

(21) Appl. No.: 10/306,940

(22) Filed: Nov. 27, 2002

(65) Prior Publication Data
US 2004/0203437 A1    Oct. 14, 2004

(51) Int. Cl.
*H04M 3/00* (2006.01)
(52) U.S. Cl. .................. 455/420; 455/423; 455/419
(58) Field of Classification Search .............. 455/423, 455/456.1, 456.3, 418, 419, 420; 370/870.07
See application file for complete search history.

(56) References Cited

U.S. PATENT DOCUMENTS 7,043,237 B2 *   5/2006   Snyder et al. ............. 455/425
2001/0028313 A1 *  10/2001 McDonnell et al. ... 340/870.07
2002/0049523 A1    4/2002  Diaz et al.

FOREIGN PATENT DOCUMENTS

| DE | 10152077 | 10/2001 |
|---|---|---|
| EP | 1021055 | 1/2000 |
| WO | WO 02/58327 | 1/2002 |
| WO | WO 02/71780 | 3/2002 |

OTHER PUBLICATIONS

I. F. Akyildiz, W. Su, Y. Sankarasubramaniam, E. Cayirci—"Wireless Sensor Networks: A Survey", Computer Networks 38 (2002); 2002 Published by Elsevier Science B.V.; pp. 393-422.
European Search Report dated Mar. 5, 2004.
Statement Regarding IEEE Standard 1451.2 submitted by R. Ross Viguet, May 14, 2003.

\* cited by examiner

*Primary Examiner*—Lewis West (57) ABSTRACT

Disclosed are systems and methods for utilizing a pool of mobile devices in probing operations comprising a probing host system including probe management and data management operative aspects, and a pool of mobile devices, one or more of which are operative under control of the probe management to provide probing data to the data management, wherein the one or more mobile devices comprise mobile devices for which location and movement is not under control of the probing host system.

23 Claims, 2 Drawing Sheets

SYSTEMS AND METHODS FOR MEASUREMENT AND/OR CONTROL USING MOBILE PROBES

TECHNICAL FIELD

The present invention is related generally to probing systems and methods and, more specifically, to probing for measurement and/or control using mobile probes.

BACKGROUND

In traditional measurement systems, there are typically a finite number of fixed measurement devices, all known to and controlled by the measurement system. Generally such measurement devices are specifically configured and deployed for use by the measurement system at or as near as is practicable to a point at which measurement data is to be collected. When a set of measurements is to be made the system typically will download or otherwise configure each of these devices via whatever communication medium is provided, e.g., a measurement bus such as an IEEE-488 BUS, a local area network (LAN) connection, a serial link, or the like. The measurements are then made on command, periodically, or perhaps based on a time schedule. Depending on the sophistication of the devices, these measurements may be made by the device relatively independently from the rest of the measurement system. For example, a scheduled or periodic data collection based on an internal device clock, perhaps synchronized to other clocks in the system may be made. Alternatively, devices may require an active command from the system for each measurement. The results typically are then delivered to the rest of the measurement system via the communication medium. Such measurement systems also typically include one or more processors or computers that execute control and analysis software for the measurement system.

One of the key features of these existing systems is that the identity and location of each measurement device is known. Typically this information forms a basis for initiating control and for associating any resulting data with real world parameters being measured. Accordingly, the device identity, however represented, is often a pseudonym for the location of measurement and the resultant measure. Typically users of existing measurement systems know what instruments are available, what the instruments' locations are, how to access the instruments explicitly, and when data will be returned.

These traditional technologies for building a measurement or control system typically employ a rack of equipment connected to a computer or other processing device via an IEEE-488 interface or LAN. In such a system a user knows exactly which instruments are available. Typically a user writes a program or otherwise sets up a schedule to make measurements. In short, in existing measurement systems a user knows what is being tested, all the instruments available when the measurements are going to made, and when data will be returned. Thus, existing measurement systems are relatively closed.

IEEE Standard 1451.2 formalizes something that has been present to a greater or lesser degree in at least some existing classes of measurement instruments. IEEE 1451.2 provides standard units of measurement, how often measurements can be taken, the accuracy of the measurement, limits of the measurements, how to correct for nonlinearities in the measurement device, and the like which are contained within an electronic data sheet that a computer or interface may read. Thus, an IEEE 1451.2 compliant instrument returns not only a reading, but also sufficient information, metadata, as to how to interpret the reading including units of measure, the instrument accuracy, and the like. IEEE 1451.2 is the standard that addresses how to specify that metadata.

IEEE standard 1451.2 has allowed some freedom with respect to use of measurement devices by providing an orderly and explicit representation of some aspects of measurements, such as units, standardized names of variables, and the like, to be resident in existing measurement devices supporting this standard. This allows supporting measurement devices to be "self-describing" with the result that an anonymous device may be able to report its properties or measurements without reference to its location or identity. However, existing systems, even those with IEEE 1451.2 compliant devices, still typically require explicit representation of the identity of devices. Moreover, existing systems are generally unable to provide meaningful analysis of data without accurate reference to its location.

Existing mobile measuring techniques typically employ transporting equipment to a known location to take measurements at known and/or scheduled times. In existing measurement systems a user wants to know some fact about the world or a particular environment at a particular place and time. To gather this fact the user places an instrument at that place so it can take a measurement at the desired time, or the user sends an instrument to that place to take a measurement at that time.

BRIEF SUMMARY OF THE INVENTION

An embodiment of the invention provides a system for utilizing a pool of mobile devices in probing operations, the system comprising a probing host system including probe management and data management operative aspects, and a pool of mobile devices one or more of which are operative under control of the probe management to provide probing data to the data management, wherein the one or more mobile devices comprise mobile devices for which location and movement is not under control of the probing host system.

An embodiment of the invention provides a method for probing using a pool of mobile devices, the method comprising determining spatial aspects with respect to a desired probing activity, configuring selected ones of the mobile devices for the desired probing activity, the configuring being under control of a probing system and the selected ones of the mobile devices being selected by the probing system as a function of the spatial aspects, communicating probing data between the mobile devices and the probing system, and processing the probing data.

An embodiment of the invention provides a computer program product having a computer readable medium having computer program logic recorded thereon for utilizing a pool of mobile devices in probing operations, the computer program product comprising code operable at a probing host system for providing probe management, code operable at the probing host system for providing management of probing data, code, operable upon mobile devices of a pool of mobile devices and under control of the code providing probe management, for providing probing data to the probing data management code, wherein the one or more mobile devices comprise mobile devices for which location and movement is under control of a user thereof independent of the probing operations.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION

The present invention is directed to systems and methods for probing (i.e., providing measurement and/or control) various environments, systems, mediums, etcetera (measurement regions) using mobile probes. According to preferred embodiments of the present invention, probes are not only not fixed at a given point in space, but their location and movement may not be under the control or direction of the systems and methods of the present invention. Moreover, mobile probes utilized according to the present invention may comprise probes which are not specifically adapted for use by the systems and methods of the present invention and/or may incorporate a pool of mobile probes having differing capabilities and attributes. In accordance with the present invention, mobile probes are moving, or may be moved, through a measurement region where measurements are to be taken.

It should be appreciated that reference to mobile probes utilized with respect to measurement herein includes probes providing sensors and/or actuators. Accordingly, various probes of the present invention provide devices that can measure or otherwise collect data (sensors) and/or set the value of some real world quantity (actuators).

There are a variety of candidate platforms for mobile probes in accordance with the present invention. Regardless of the particular platform implemented, mobile probes of the present invention preferably include features such as an ability to communicate with devices external thereto, a computational resource associated with the device to manage the measurement process, access to, whether internal or external, a probing device (sensor or actuator), and availability at some point at a location associated with a measurement region. As will be better appreciated from the discussion that follows, preferred embodiments of the present invention are adapted to operate with respect to mobile probes wherein the location of a particular device at any given point in time and space is generally known, e.g. known only statistically, and/or with a relatively high degree of uncertainty.

Existing platforms which may be utilized as mobile probes according to the present invention include wireless telephones (e.g., cellular and personal communication system (PCS) phones), personal digital assistants (PDAs), pagers, personal computers, cameras, calculators, automobiles, aircraft (including drones), other vehicles, free floating buoys, and the like. Moreover, collections of devices may be combined to provide a platform for use as a measurement probe in accordance with the present invention, if desired. Devices of the aforementioned platforms may be adapted according to the present invention, such as to include probing instruction sets and/or one or more probing devices, to provide probing functionality as described herein. However, it should be appreciated that some such devices may already include probing devices to facilitate their primary operation. Accordingly, preferred embodiments may leverage this infrastructure in implementing measurement and/or control systems and methods of the present invention.

For example, the aforementioned wireless phones are devices that have communication capabilities, computational resources, and some measurement capability and are increasingly available, thereby making them excellent candidates for probing applications according to the present invention. The measurement capability of such wireless phones may be built-in for measuring properties of the wireless phone itself or the communications infrastructure it employs. Additionally or alternatively, measurement resources, externally connected or otherwise, may be made available for use in adapting wireless phones as mobile probes of the present invention. For example, measurement resources may be connected to a wireless phone via a serial interface to facilitate a probing scheme of the present invention.

It should be appreciated that measurement capabilities may be available with respect to various ones of the aforementioned devices. For example, digital cameras may include sensors for measuring attributes of their environment, such as light levels, as well as including processing capacity and even temporal (e.g., date and/or time) information. Although cameras are typically not yet adapted for wireless communication, they often do provide for interfacing with a wireless or network enabled host, such as a wireless enabled PDA and/or an Internet connected personal computer, for batch downloading of photographic images.

It should be appreciated that combinations of the aforementioned mobile devices may be utilized in providing probing according to the present invention. For example, a particular type of mobile device, such as a wireless (e.g., cellular or PCS) telephone, may be employed because of their inclusion of a wireless interface to thereby provide real-time or near real-time probing of the measurement region. However, additional types of mobile devices may also be employed to provide more robust probing. For example, PDAs may be employed in addition to the aforementioned wireless telephones because of the PDAs providing additional probing capability, additional processing power, or availability more near a point of interest within the measurement region, although perhaps having some less desirable attribute, such as not having wireless communication capability resulting in non-real-time downloading of probing information.

Existing measurement systems are unsatisfactory when many or all of the measurement devices are mobile and/or not directly or exclusively associated with the measurement system. For example, mobile phones are owned by their users and not under the control of a measurement system. Problematically, use of such devices as measurement devices would introduce an unknown quantity to an existing measurement system, namely a measurement system user does not know which devices are going to be where, at the time a measurement is made.

However, there are numerous applications for which probing systems utilizing mobile devices as probes are useful. Communications infrastructure, particularly wireless infrastructure, may employ such devices, perhaps based on some variant of a wireless phone, to provide infrastructure monitoring, planning, maintenance, control, and/or the like. Other candidate probing applications are suggested by the likely pervasiveness of probes, such as wireless phones, including environmental monitoring, population behaviors, evaluation of disaster conditions, and/or the like. It should be appreciated that use of such mobile probes need not be with respect to probing aspects directly related to the operation of the probes but instead may probe aspects which otherwise are of little or no interest with respect to the operation of the mobile probes.

Figure 1:
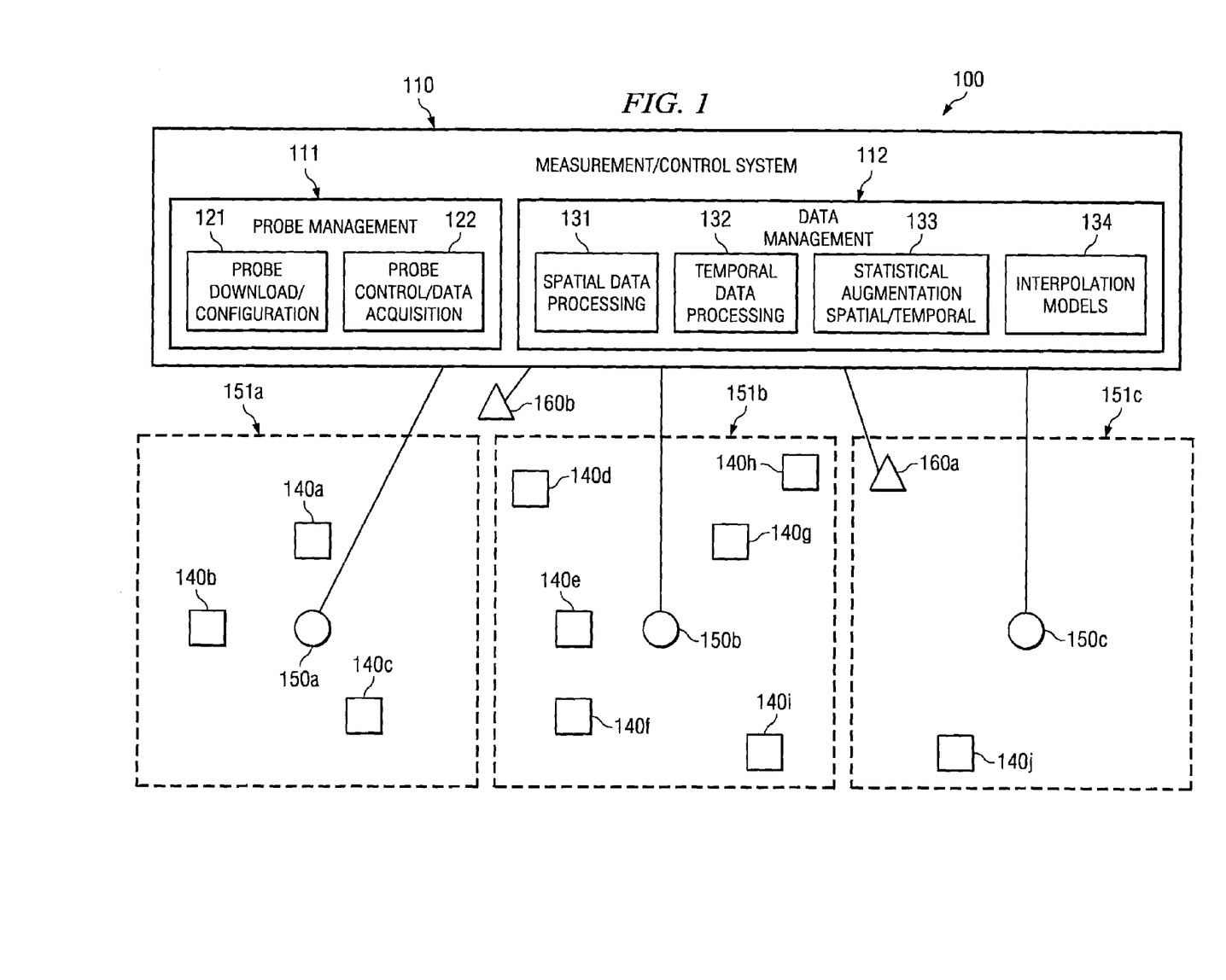
FIG. 1 shows a functional block diagram of a preferred embodiment of the present invention.

Directing attention to FIG. 1, a preferred embodiment probing system configuration is shown generally as probing system 100. Probing system 100 of the illustrated embodiment includes measurement/control system 110 and a plurality of mobile devices 140a-140j disposed in measurement regions 151a-151c. Probing system 100 of the illustrated embodiment also includes link nodes 150a-150c and 160a-160b utilized in providing communication between measurement/control system 110 and mobile devices 140a-140j used therewith.

Preferred embodiments of measurement/control system 110 provide a plurality of probe system functional aspects, such as probe management 111 and data management 112 of the illustrated embodiment. Such functional aspects may be provided in a centralized architecture for controlling probing for measurement and/or control as desired using mobile devices according to the present invention. Additionally or alternatively, measurement/control system 110 may comprise a distributed architecture, such as to provide distributed or hierarchical control of probing for measurement and/or control as desired using mobile devices according to the present invention. For example, multiple ones of measurement/control system 110, preferably having data communication therebetween for cooperative operation, may be deployed throughout a probing system. Additionally or alternatively, various functional attributes, or portions thereof, illustrated with respect to measurement/control system 110 may be provided by other systems, such as mobile devices 140a-140j and/or link nodes 150a-150c and 160a-160b.

Figure 2:
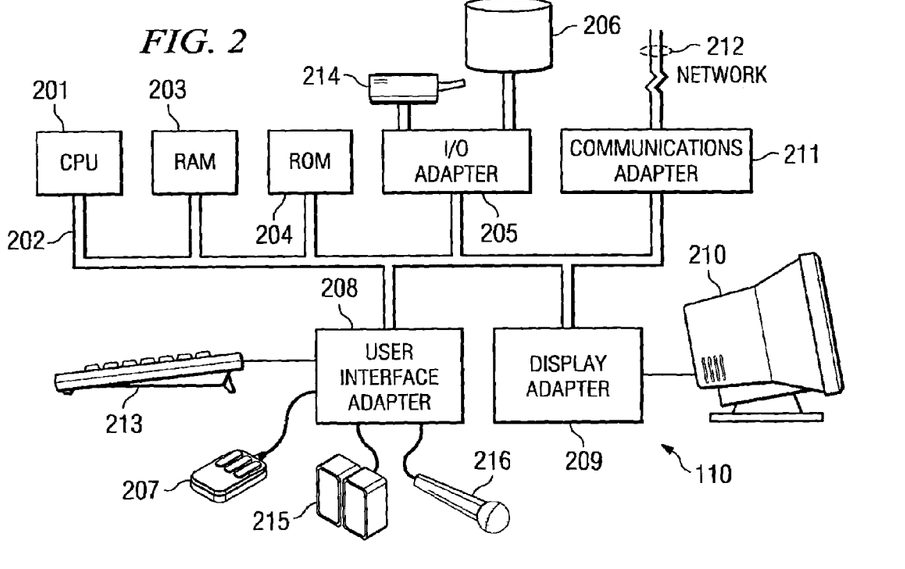
FIG. 2 shows detail with respect to a preferred embodiment measurement/control system of FIG. 1.

Directing attention to FIG. 2, a general purpose processor-based system adapted for use as measurement/control system 110 is shown. Central processing unit (CPU) 201 is coupled to system bus 202. CPU 201 may be any general purpose CPU, such as a processor from the INTEL PENTIUM family of processor devices. However, the present invention is not restricted by the architecture of CPU 201 as long as CPU 201 supports the inventive operations as described herein. Bus 202 is coupled to random access memory (RAM) 203, which may be SRAM, DRAM, or SDRAM. ROM 204 is also coupled to bus 202, which may be PROM, EPROM, or EEPROM. RAM 203 and ROM 204 hold user and system data and programs as is well known in the art.

Bus 202 of the illustrated embodiment is also coupled to input/output (I/O) adapter 205, communications adapter 211, user interface adapter 208, and display adapter 209. I/O adapter 205 connects to storage devices 206, such as one or more of a hard drive, a CD drive, a floppy disk drive, a tape drive, to the computer system. I/O adapter 205 is also connected to printer 214, which may allow the system to print paper copies of information such as documents, reports, graphs, etc. Note that the printer may be a printer (e.g. dot matrix, laser, etc.), a fax machine, or a copier machine. User interface adapter 208 couples user input devices, such as keyboard 213, pointing device 207, and microphone 216, to the measurement/control system 110. User interface adapter 208 may also provide sound output to a user via speaker(s) 215. Display adapter 209 is driven by CPU 201 to control the display on display device 210. Of course, embodiments of the present invention may implement different combinations of the above functional aspects with respect to embodiments of measurement/control system 110, if desired.

Communications adapter 211 is preferably adapted to couple the measurement/control system 110 to network 212, such as may be utilized in providing communication between measurement/control system 110 and any of mobile devices 140a-140j and/or link nodes 150a-150c and 160a-160b of the illustrated embodiment. According to a preferred embodiment, network 212 may comprise one or more of a telephone network, a wireless network, a local area network (LAN), a metropolitan area network (MAN), a wide-area network (WAN), the Internet, and/or the like.

Various mobile devices, particularly wireless phones, may have a capability for making measurements and, therefore, may comprise mobile devices 140a-140j of the illustrated embodiment. In particular, wireless phones have, as part of the way cellular systems work, an ability to make at least some measurements of the cellular system itself and/or measurements with respect to the presence of interfering signals. Increasingly, these devices have a capability of measuring other information, such as position and/or velocity using radio location techniques. Moreover, it is expected that the capabilities of mobile devices will continue to enhance the performance of these mobile devices as probes of the present invention as device enhancements become more prevalent in time. For example, the Federal Communication Commission (FCC) has mandated that location services eventually be made available in wireless telephony systems for use by emergency response systems. In a probing system of the present invention employing such a communication system, the measurement device might report its measurement data along with the associated spatial coordinates, however represented, and ideally the time as well.

Utilizing such devices as mobile devices 140a-140j according to the present invention may include additional programming and/or an auxiliary sensor or actuator interfaced with communication functionality. For example, most modern wireless phones provide for download of programming code, such as in the form of JAVA bytecode, as well as provide an interface for coupling electronics thereto. Code downloaded into a wireless phone, such as under control of probe download/configuration 121, may access a capability of the wireless phone such as to make RF measurements, and when the wireless phone places a call, it may include the results of measurements into the preambles and/or headers of an ordinary digital phone call so that measurements are reported, such as in response to control instructions from probe control/data acquisition 122, without interfering with use, transmission or reception, by the wireless phone. When a wireless phone enters a cell it may receive measurement instructions during its "hand shaking" procedure for that cell. As a further alternative, a measurement instruction may be issued, such as under control of probe control/data acquisition 122, using a short messaging service (SMS) incorporated into various wireless phones and systems.

Mobile devices 140a-140j are free to be moved about an area according to the present invention. Accordingly, mobile devices 140a-140j of the preferred embodiment are not limited to operation within measurement regions 151a-151c and, therefore, may be transported beyond these regions. However, mobile devices 140a-140j are preferably selected according to the present invention such that one or more of mobile devices 140a-140j is likely to be disposed in a measurement region or regions of interest, such as measurement regions 151a-151c. Accordingly, although mobile devices 140a-140j may comprise devices based upon a configuration of platforms, such as the aforementioned wireless telephones, PDAs, pagers, automobiles, etcetera, the particular mobile devices and/or mobile device platforms implemented with respect to embodiments of the invention are preferably selected with consideration of those devices/platforms likely to move to within the desired measurement region or regions and/or particular locations therein. Additionally or alternatively, the particular mobile devices and/or mobile device platforms implemented with respect to embodiments of the invention may be selected with consideration of those devices/platforms having desired characteristics, such as having or being adaptable to have particular probe capabilities, desired accessibility (e.g., real-time/non-real-time response), available processing power, and/or the like.

Figure 3:
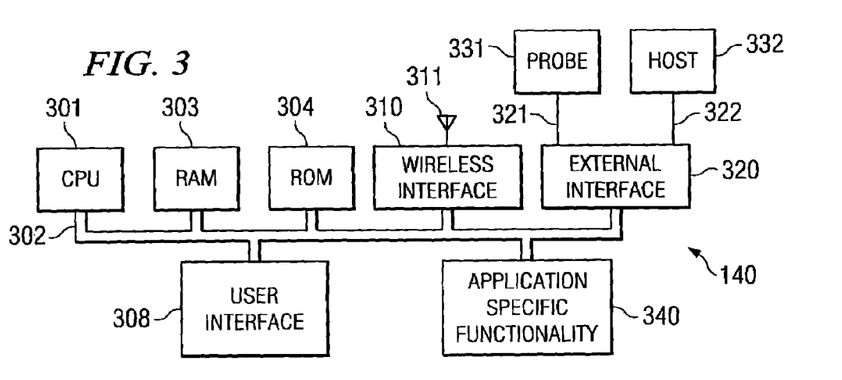
FIG. 3 shows detail with respect to a preferred embodiment mobile device of FIG. 1.

Directing attention to FIG. 3, a processor-based system adapted for use as mobile device 140 of the present invention, such as may comprise a wireless telephone, a PDA, a pager, a digital camera, an automobile, or the like, is shown. CPU 301 is coupled to system bus 302. CPU 301 may be any general or special purpose CPU, such as a processor from the ZILOG Z80, INTEL STRONGARM or PENTIUM families of processor devices. However, the present invention is not restricted by the architecture of CPU 301 as long as CPU 301 supports the inventive operations as described herein. Bus 302 is coupled to RAM 303, which may be SRAM, DRAM, or SDRAM. ROM 304 is also coupled to bus 302, which may be PROM, EPROM, or EEPROM. RAM 303 and ROM 304 hold user and system data and programs as is well known in the art.

Bus 302 of the illustrated embodiment is also coupled to user interface 308, wireless interface 310, external interface 320, and application specific functionality block 340. User interface 308 couples user input devices, such as a keypad, keyboard, touch screen, pointing device, microphone, and/or the like (all not shown) to mobile device 140. User interface 308 may also provide output, such as via a video display, printer, audio speaker, and/or the like (all not shown). Wireless interface 310 may be utilized with antenna 311 in providing data communication between mobile device 140 and another wireless device, such as a cellular base transceiver station (BTS) or a wireless access point of a wireless LAN (WLAN) as may comprise any of link nodes 150a-150c, another mobile device 140, and/or the like. Application specific functionality block 340 may provide operability according to a core aspect of mobile device 140, such as measurement of received signal strength, bit error rate, quality of service metrics, and/or the like where mobile device 140 comprises a wireless telephone, ambient light measurement where mobile device 140 comprises a digital camera, or vehicle speed where mobile device 140 comprises an automobile. Application specific functionality block 340 may be utilized, whether exclusively or in combination with other devices such as probe 331, in probing an environment according to the present invention.

External interface 320 may be utilized with link 321 to couple probe 331, such as may comprise a sensor device and/or an actuator device, to mobile device 140 for use in probing an environment according to the present invention. Probe 331 may comprise any number of probe configurations, whether including sensors and/or actuators, for providing desired operability. For example, probes for acquiring readings with respect to temperature, humidity, air quality, light levels, images, sound levels, position, velocity, altitude, and/or the like may be configured with an appropriate interface for communicatively coupling to a particular mobile device. Similarly, probes for manipulating the environment such as by light output, sound output, RF output, control signal output, and/or the like may be configured with an appropriate interface for communicatively coupling to a particular mobile device. External interface 320 may additionally or alternatively be utilized with link 322 to couple host 332, such as a docking station, host computer system, network node, and/or the like, as may comprise any of link nodes 160a-160b, to mobile device 140 for use in communicating probing information between mobile device 140 and measurement/control system 110 according to the present invention. Of course, embodiments of the present invention may implement different combinations of the above functional aspects with respect to embodiments of mobile device 140, if desired.

Link nodes 150a-150c and 160a-160b may comprise any number of interface configurations suitable for facilitating information communication between mobile devices 140a-140j of the preferred embodiment. For example, link nodes 150a-150c may comprise BTSs disposed for providing wireless communication within corresponding ones of measurement regions 151a-151c. According to one embodiment of the present invention, link nodes 150a-150c comprise BTSs of a wireless telephone network and measurement regions 151a-151c may comprise sectors and/or cells thereof. Similarly, link nodes 160a-160b may comprise docking stations or other host devices disposed for providing host interaction with ones of mobile devices 140a-140j. According to one embodiment of the present invention, link nodes 160a-160b comprise network (e.g., Internet) connected personal computers adapted to communicatively couple with one or more mobile devices 140a-140j, such as through wireline interfaces including a universal serial bus (USB), a parallel interface, a serial interface, a fiber optic interface, or a network interface (e.g., Ethernet) and/or through wireless interfaces including a radio frequency interface (e.g., BLUETOOTH or IEEE 802.11) or optic interface (e.g., infrared (IR), LASER, or optocoupler). According to embodiments of the present invention, link nodes 150a-150c and/or link nodes 160a-160b may comprise data acquisition nodes, such as RF readers deployed at toll booths for reading toll passes attached to vehicles and the like.

Link nodes 150a-150c and 160a-160b may be coupled to measurement/control system 110 via any of a number of links, including one or more of a telephone network, a wireless network, a LAN, a MAN, a WAN, the Internet, and/or the like. It should be appreciated that link nodes utilized in providing communication between mobile devices 140a-140j and measurement/control system 110 of the present invention need not themselves be disposed within measurement regions and, therefore, may be disposed external thereto as is link node 160b. Moreover, it should be appreciated that one or more of mobile devices 140a-140j may be provided data communication with measurement/control system 110 without the use of link nodes, such as by coupling directly thereto, if desired.

When implemented in software, the elements of the present invention are essentially the code segments to perform the necessary tasks. The program or code segments can be stored in a computer readable medium or transmitted by a computer data signal embodied in a carrier wave, or a signal modulated by a carrier, over a transmission medium. The "computer readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, an intranet, a wireless network, etcetera.

From the above description of a preferred embodiment probing system, it should be appreciated that probing systems of the present invention may not address any particular measurement device entity, but instead entities with a particular property may be addressed, such as under control of probe control/data acquisition 122 of measurement/control system 110. In many situations in which embodiments of the present invention may be utilized, the type and/or number of measurement devices that will respond with measurements is unknown, accordingly data management 112 of measurement/control system 110 of the preferred embodiment is adapted to deal with zero, one or numerous measurements, such as using statistical augmentation 133 and/or interpolation models 134. Moreover, preferred embodiments of data management 112 provide processing of data to normalize, standardize, and/or homogenize data associated with a plurality of differently configured probes.

In accordance with embodiments of the present invention, the identity of an individual measurement device is not the key to establishing communication and control of a measurement system, as with prior measurement systems, since assumptions about a specific one of the preferred embodiment mobile measurement devices at a point in space and time and the appropriateness of its configuration to make a needed measurement is problematic. For example, mobile devices utilized for probing according to the present invention, such as wireless phones, are carried about by individuals other than those making measurements. Although a wireless phone owner may be willing to allow non-interfering use of the device by a measurement system, such as in exchange for a few free minutes on their service plan, such wireless phone users generally cannot be required to be at a point of interest at a time of measurement nor can such wireless phone users generally be expected to actively participate in the measurement process. However, these devices, at least occasionally, are in communication in such a manner that a party interested in making measurements can make contact with the device. Communication, control, and/or management of data returned from measurement devices may be based, at least in part, on some spatial property of the measurement device and/or some temporal attribute with respect to the measurement device.

Preferably, measurement applications of data management 112 of the illustrated embodiment make use of a statistical space-time distribution of potential measurement devices. Accordingly, spatial data processing 131 may operate to select or predict those mobile devices (such as by device type or other device attribute) likely to be at or near a location, such as within a particular measurement region, for which measurement is desired and/or process data acquired by a measurement query or instruction with respect to spatial attributes, such as to associate measurements spatially, to extrapolate information for a desired location from spatial information provided, etcetera. Similarly, temporal data processing 132 may operate to select or predict those mobile devices (such as by device type or other device attribute) likely to be available for conducting desired measurements at or near a time for which measurement is desired and/or process data acquired by a measurement query or instruction with respect to temporal attributes, such as to associate measurements temporally, to extrapolate information for a desired time from temporal information provided etcetera.

Preferred embodiments of the present invention replace device identity with spatial properties of devices employed. These spatial properties may be augmented by other properties such as time, capability, statistics, and the like. This model of operation in which the probing system, perhaps in response to input from the user, specifies the space-time region defining an area of measurement, and may further provide information with respect to the expected behavior, measurements, to be exhibited.

Preferably, it is possible to associate a mobile device utilized according to the present invention with its location to some degree of certainty. Therefore, devices are preferably referenced based on their location. There are several ways to achieve this association between a measurement device and its location. For example, the device may include a GPS receiver or similar technology, the device may request its location from a communication system such as a cellular telephone system in the area, the location may be defined as the region in which a device can receive a communication (e.g., particular cell of a cellular telephone system), and/or the like.

Preferably data exchanged between measurement/control system 110 and mobile devices 140a-140j, such as collected measurement data, will be space stamped and time stamped to whatever uncertainty is inherent in the space and time measurements of the system and/or components thereof. Likewise, data to be gathered might be specified based on location and time rather than a device and time. Thus, control of mobile probe devices may also be based on location, however represented, possibly augmented by time. For example, measurement/control system 110, such as through probe control/data acquisition 122, might specify that "within an area bounded by coordinates x and y measure the radio frequency (RF) field strength every 30 seconds". All devices receiving the message and finding themselves within the defined area may then conduct the required measurement.

It should be appreciated that the above described probing system behaves quite differently from existing traditional measurement systems and this may be taken into account in an overall design of an application requesting information from the measurement system. For example, there may be no probes in a measurement region at the time of interest, or conversely there may be thousands of probes therein. Applications employing the present systems and methods preferably operate on a basis employing statistical analysis, such as provided by statistical augmentation 133, due to the inability to either require or know that a measuring device will be at a specific point at a specific time. Applications are preferably robust in the face of sparse data, as well as over-sampled data, such as through use of interpolation models 134.

For example, if wireless phones are the measurement devices employed by a measurement system monitored around the Las Vegas convention center, one has considerably different collection statistics at 2:00 am on Thanksgiving night than midday the day a large tradeshow such as Comdex is in session. Such measurement systems may benefit from incorporating models to manage the varying collection space-time densities encountered. Thus while the system might have to wait for days for a device to be exactly at a specific location, it is much more likely that there will be points in close enough proximity to allow spatial interpolation based on an appropriate model.

Similar issues arise with respect to temporal behavior. However, depending on the nature of the problem it can be expected that the present systems and methods will provide better coverage due to patterns of motion of the measurement devices employed than could economically be achieved by the placement of fixed probes or the explicit scheduling of directed mobile probes. This is particularly true when the measurement devices are part of a consumer device, such as the nearly ubiquitous wireless telephone.

Figure 4:
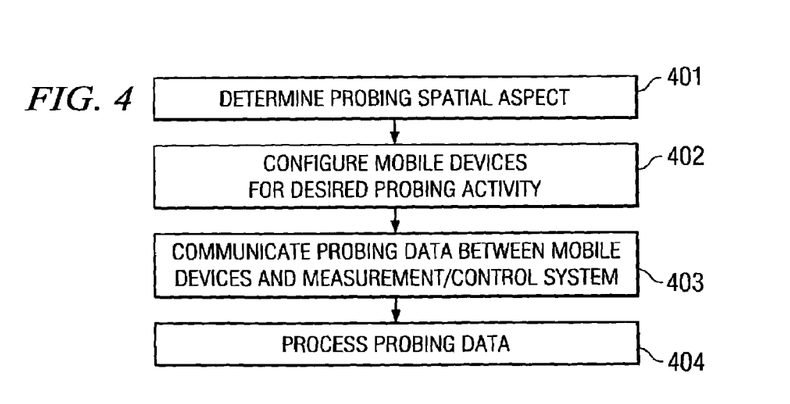
FIG. 4 shows a flow diagram of operation according to a preferred embodiment of the present invention.

Directing attention to FIG. 4, steps implementing aspects as described above according to an embodiment of the present invention are shown. Specifically, in operation according to the embodiment illustrated in FIG. 4, a probing spatial aspect is determined, such as identifying a desired measurement region by identifying BTSs having a particular coverage area, identifying geographic coordinates, identifying mobile unit proximities, and/or the like, at step 401. At step 402 mobile devices which are candidates for providing the desired probing activity are configured, such as by pushing instruction sets and/or control attributes to a pool of suitably configured and/or suitably disposed mobile devices. It should be appreciated that the aforementioned suitably configured mobile devices may comprise mobile devices having different configurations which alone or in combination provide probing functionality as desired. Similarly, it should be appreciated that the aforementioned suitably disposed mobile devices may comprise mobile devices which are not presently disposed within a desired region and which may never be disposed in the desired region. Such mobile devices are, however, preferably selected to include mobile devices which statistically will experience desired coverage with respect to the desired region.

Probing data is communicated between the mobile devices and a measurement/control system of the present invention at step 403. Such information may include queries for measurement data by the measurement/control system or agents thereof, results of measurements by mobile devices experiencing the proper conditions for conducting measurements, control signals for mobile devices to manipulate their environment provided by the measurement/control system or agents thereof, and the like. Additionally, information useful in processing information collected by probes of the present invention may be communicated to the measurement/control system or agents thereof. For example, configuration data, version data or other metadata may be communicated along with the collected data to assist in its use or understanding. This data is processed by appropriate devices, such as the mobile devices and/or measurement/control system, at step 404.

It should be appreciated that, although preferred embodiments have been described herein with reference to scenarios in which probing is controlled with respect to "within an area", other spatial and/or temporal models may be provided according to the present invention. For example, a probing system of the present invention, such as via probe control/data acquisition 122, could specify that all probes within 100 meters of each other make some joint measurement. This might cause or control probes to interact with each other, such as using so-called "ad hoc" networking communication protocols. Such ad hoc networking of probes may not only be used to provide the desired probing functionality, but may also be used to facilitate management changes as well. For example, probes may interact with each other via ad hoc networks to communicate measurement requests, measurement code, etcetera to and between each other. Where at least one Probe received the appropriate instructions from a probe management system, the probes may ad hoc network to communicate that information rapidly to each other without the higher level system's awareness or further involvement. As an example, a probe that finds itself at PacBell ball park may receive its instructions from its peers rather than the overhead of communicating to the higher level system. Accordingly, a "when in Rome, act like a Roman" strategy may be implemented which minimizes the use of system overhead as well as easily accommodates the highly mobile nature of mobile devices. Moreover, such a strategy works in cases where communication to the higher level system is unavailable due to network problems.

As a further example of other spatial and/or temporal models, a probing system, such as via probe control/data acquisition 122, might request that 10% of the probes in an area take action A while the rest take action B. Each probe finding itself in the region might choose between actions A and B based on a random number, for example, as opposed to being specifically configured as in a traditional existing measurement system.

Similar to the concept that each probe may choose between actions A and B, such as based on a random number, probes of the present invention may be empowered to exhibit a level of autonomy in the probing process. For example, a probe could decide to perform a measurement action when the uncertainty in some parameter is less than x (e.g., when the uncertainty of the measured quantity or of the current location is very low, then make the measurement). Such an embodiment may be utilized in providing a distributed scheme to have the probes self select when to make measurements based on their ability to make "good" measurements.

Configuration of such devices may similarly be based on spatial specifications. Configuration may include actions such as downloading new software into a mobile device or devices and/or activating previously installed software, such as under control of probe download/configuration 121. Thus, a probing system of the present invention might specify that in region A all, or some percentage of the mobile devices, download program A for execution. This specification by the probing system might take place as a device finds itself in region A. Alternatively, the download specification might be applied to a larger, region that includes region A such that a device has already downloaded the required program if and when it enters region A.

Another configuration option is that configuration may take place at the factory or at some logically equivalent place, such as a "home base". For example, there may be a reason to have all mobile devices of a particular platform, model, configuration, etcetera inherently capable of some spatial based measurement or several alternative spatial based measurements (e.g., a probing system of the present invention might have some probes capable of multiple measurements, have a certain percentage configured for each measurement, etcetera). When arriving within region A, where a request for a certain one of these pre-configured measurements is active, those devices capable of executing the measurement may then do so.

Such spatial specifications may be augmented by other specifications, such as temporal specifications. For example, "within region A, but only between the hours of 10 am to 2:00 pm", or "within region A, but only if the device is of a particular class", (for example, a digital camera, a phone of a specific manufacturer, or the like).

Communication processes in probing systems of the present invention employing mobile devices as probes may likewise be different from traditional existing measurement systems. Specifically, while a measurement may be made in accordance with the present system at a certain point in space-time the results may be reported at a quite different point in space and at a later time due to a relationship between the motion of the device and allowed periods for communicating measurement results and/or intermittent availability of communication links to a measurement/control system of the invention. For example, a mobile device may make measurements during periods when it is not in communication with the rest of the probing system. The mobile device might log the results and report them to the probing system later (whether minutes, hours, days, weeks, or even longer periods), such as when again in an area of wireless communication or when docked with an appropriate host. Also, the spatial velocity and communication latency may be such that, even though in continuous communication, significant movement and delay exists between the measurement place and place and time and reporting time.

Preferably, the probing system infrastructure is designed to manage the reported data appropriately, such as by spatial data processing 131 and/or temporal data processing 132 utilizing space-time stamps with respect to the data. Such spatial and temporal data management may comprise properly correlating data by location and/or time for further processing and/or analysis. Moreover, such spatial and temporal data management may comprise techniques to accommodate uncertainties associated with the use of highly mobile probes. For example, data received at a point remote from the region in which an application is measuring is preferably correctly delivered to the proper application. Applications of the preferred embodiment deal with data that arrives with considerable latency compared to the normal speed of operation. Accordingly, explicit inclusion of models may be employed. Where initial returns from a desired set of measurements may be sparse in space-time, an appropriate model may make a best estimate (including an estimate of uncertainty) of the actual values. However, as additional data is reported, due to the statistical appearance of measurement devices and the statistical nature of the communication system reporting the data, these models can then refine their estimates of the actual values. This is in contrast to traditional existing measurement systems where the data is gathered more or less as a snapshot and then immediately used for display or computation depending on the application.

According to a preferred embodiment, probes of the present invention provide information with respect to the uncertainty in their location and/or uncertainty in time associated with the operation of probing functionality, e.g., making probing measurements. For example, at time A, a probe may have an accurate location and time fix, such as may be acquired by GPS and/or as determined by the network. However, during the following interval the probe may lose the GPS fix and/or its link with the network. Thereafter, although continuing to perform probing operations, recording probing data and location and/or time stamping data associated therewith, the probe's internal location and clock may "drift", therefore providing less accurate values. At a later time B, the probe may establish a new GPS lock and/or network link and determine its new location and time accurately, thus re-synchronizing its internal clock and location information. However, during the interval, the probe may have made a sequence of measurements and cached the resulting values, along with corresponding time and location stamps. According to preferred embodiments of the present invention, the probe tags these measurements with uncertainty information. Systems of the present invention, such as spatial data processing 131 and/or temporal data processing 132, or other systems processing and/or analyzing the data (perhaps even the probe itself in further processing the data) may utilize such uncertainty information to know that the location and timestamp are very accurate at time A and time B, and that the location and timestamp accuracy degrades in some way during the interval therebetween.

In the above example, it should be appreciated that the location and timestamp uncertainty will be expected to be greatest somewhere in between time A and B. There are many cases where the uncertainty may be extremely large. For example, a probe that is participating in probing activity according to the present invention may originally be located in New York City, having its communication sub-system powered off as the airplane in which the owner thereof takes off. The probe's communication sub-system may be subsequently powered back on with the probe determining that it is now in San Francisco, without the probe having no or little information with respect to the route it traversed (e.g., through Chicago or Denver), and that 5 hours have elapsed.

Preferred embodiments of the present invention operate to analyze the uncertainty information associated with probing data in order to intelligently utilize the data in further processing and/or analysis. For example, where the locations and/or times at the points for which accurate measurements were known to have been taken, i.e., points A and B, are relatively close in space and/or time, relatively straight forward extrapolation techniques may be utilized with respect to the uncertainty information. However, where the locations and/or times at the points for which accurate measurements were known to have been taken (points A and B) are relatively distant in space and/or time, e.g., the New York City and San Francisco example above, more complex and/or severe steps may be taken. For example, where location data known to a reasonable certainty is widely separated, with little or no information with respect to location, direction, velocity, etcetera available for the interval, embodiments of the present invention may operate to discard the intervening data or to use the data only in a broad statistical model.

Additionally or alternatively, embodiments of the present invention may utilize other available information or information that may be obtained from available sources to supplement the uncertainty information and, thereby, provide more certainty with respect to the probing data. For example, the use of integrated devices, such as mobile phones with personal information systems (e.g., calendars) integrated therewith are becoming popular today. A calendar entry in such a personal information system may indicate the flight number taken by the owner of the device participating in the probing activity. This information may be stored with the aforementioned uncertainty information to facilitate an estimate of the route taken in transit from New York City to San Francisco in the above example.

It should be appreciated that uncertainty may be greater with respect to one or more variables implemented with respect to a probing system. For example, with today's technology, internal clocks are very stable and typically do not drift much from a human point of view (e.g. an electronic device's internal clock may drift tens of milliseconds over a span of 5 hours). Accordingly, data processing with respect to the aforementioned uncertainty information may be different with respect to different aspects of the uncertain data. However, even where the level of uncertainty is small, processing of the uncertainty information may be implemented according to the present invention, such as with respect to measurements where even a small error degrades the results significantly(e.g., a 10 msec timestamp error may degrade the value of the results significantly in the situation where a phase error measurement is being made).

Having described preferred embodiment probing systems of the present invention, exemplary situations in which such probing systems may be utilized will be described to better aid the reader in understanding the concepts of the present invention. It should be appreciated that such situations are by way of example and are not limiting with respect to the applicable scope of the present invention.

As one example of operation of probing systems of the present invention, there may exist a need to measure the RF field strength in a cellular system, such as to plan network upgrades or address dropped call issues, by a wireless operator in the San Francisco Bay area. The service area under consideration may comprise the San Francisco peninsula, which encompasses several cities. A measurement/control system of the present invention utilized for such measurements, such as a measurement/control system disposed at one of the wireless providers mobile switching centers (MSCs) in communication with BTSs throughout the San Francisco peninsula, may be instructed that the operator wants to monitor the RF field strength within all cell sites thereof, and that it is desired that such monitoring occur periodically (e.g., every half hour). Specific spatial and/or temporal information for collecting information may be designated, such as it is desired to monitor the RF field strength at 12:00, 12:30, 1, 1:30 and so forth, on a particular day or days (whether contiguous days or not), and from all the cell sites in this region.

Code for controlling appropriate ones of a pool of mobile devices according to the desired data collection specification, such as by an operator creating the appropriate instruction sets and/or a probe management system of the present invention deriving the appropriate instruction sets, may be provided. Such code may be downloaded by a probe management system of the present invention to the aforementioned pool of mobile devices. It should be appreciated that the pool of mobile devices may extend beyond the San Francisco peninsula measurement region. For example, the operator's cellular system might extend beyond the San Francisco Bay area. Although it may not be desired to collect information with respect to the entire area served, and therefore the data collection specification provides for collecting data only within a smaller measurement region, the aforementioned code may be pushed to all compatible cellular telephones (or some other selection criteria) operating within the larger service area to increase the available pool of mobile devices poised to make the desired measurements.

Although described above with reference to pushing code to the mobile devices relied upon to actually make the desired measurements, it should be appreciated that embodiments of the present invention may additionally or alternatively provide appropriate instruction sets to other devices, such as link nodes used in providing probing system functionality. Such an embodiment might result in a configuration of some measurement code that either was previously placed in BTSs, or the measurement system would place it there, because the BTS is the point of contact for measurements based on cell phone. For example, each particular BTS might operate to decide whether it is or is not within the desired measurement region and, if it is, anytime an appropriate wireless phone appears within communication distance of that BTS it may let the wireless phone know that it should make particular measurements and/or that that the wireless phone should upload measurements already made.

Irrespective of how the mobile devices receive their instructions to make the desired measurements, they preferably implement the instructions, such as by monitoring an internal clock and every half hour making a RF field strength measurement and making an estimate of their spatial position. If the mobile device includes location circuitry, such as a GPS receiver, this circuitry may be utilized in more accurately estimating the spatial position. However, some mobile devices may not be so equipped and, therefore, may use a less accurate spatial estimation technique, such as to identify a particular cell tower (and perhaps a particular sector) they were in communication with during the measurement. Additionally or alternatively, the wireless phone may be able to query the cellular system for information with respect to their position, such as might be provided by radio location by one or more BTSs or an enhanced 911 location system.

The data collected by whatever mechanism is specified by the infrastructure may be returned to the measurement/control system the next time the mobile device is in contact with a BTS for any reason, or the next time a call is placed, etcetera. For example, a wireless phone may have received the above described instruction set, recognize it is in the identified measurement region (such as by BTS identification and/or instruction) at the appointed time or times (such as by reference to an internal clock or external clock signal) and collect measurements. The next time a user instigates a call with that wireless phone, this information may be reported, such as by encoding the data in a digital data packet, including the data as overhead or control data, etcetera. Accordingly, the wireless phone may report that it has RF field measurements and that they are −10 dBm at coordinate A at 12:00, −15 dBm at coordinate B at 12:30, and −2 dBm at coordinate C at 1:00. The aforementioned coordinates may be any form of spatial information, such as GPS coordinates, BTS identification, time delay and/or angle of arrival information with respect to a pilot or control signal, etcetera. Moreover, depending upon the movement of the wireless phone, one or more of the coordinates may be the same.

The collected data may be passed on to a requesting system, such as a measurement/control system for processing. Additionally or alternatively, the data may be processed to some extent within the collection network before being passed on. For example, BTSs of the cellular network may aggregate data for more efficient collection and communication thereof. However collected and reported, the measurement data of the preferred embodiment is processed with respect to spatial information thereof, and perhaps temporal data thereof, to thereby provide a desired view of the measured environment despite an inability to precisely identify and position the probes utilized. For example, RF field strength information actually collected, and the spatial and/or time information associated therewith, may be utilized to make conclusions with respect to RF field strength information in particular areas for which no RF field strength measurements were made. In one embodiment, RF field strength information collected from locations in near proximity to a location for which no measurement was made may be utilized to extrapolate or interpolate the RF field strength in that location. Additionally or alternatively, statistical analysis and/or historical information may be utilized in making such conclusions, such as by analyzing a trend with respect to locations radiating out from a location for which no measurement was made and/or trends over time.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for utilizing a pool of mobile devices in probing operations, said system comprising:
   a probing host system including probe management and data management operative aspects; and
   a pool of mobile devices one or more of which are operative under control of said probe management and operative under control of at least one other mobile device to provide probing data to said data management, wherein said one or more mobile devices comprise mobile devices for which location and movement is not under control of said probing host system.

2. The system of claim 1, further comprising at least one node having an interface for communicating with a mobile device of said pool to provide said probing data to said data management at a spatial location removed from a spatial location at which said mobile device collected said probing data.

3. The system of claim 1, further comprising at least one node having an interface for communicating with a mobile device of said pool to provide said probing data to said data management at a time later than a time at which said mobile device collected said probing data.

4. The system of claim 1, wherein said one or more mobile devices of said pool of mobile devices comprise a mobile device selected from the group consisting of:
   a wireless telephone;
   a personal digital assistant;
   a pager;
   a personal computer;
   a camera;
   a calculator;
   an automobile;
   an aircraft; and
   a free floating buoy.

5. A method for probing using a pool of mobile devices, said method comprising:
   determining spatial aspects with respect to a desired probing activity;
   statistically predicting which of said mobile devices are expected to experience desired coverage with respect to said spatial aspects;
   configuring selected ones of said mobile devices for said desired probing activity, said configuring being under control of a probing system and said selected ones of said mobile devices being selected by said probing system as a function of the statistical prediction;
   communicating probing data between said selected ones of mobile devices and said probing system; and
   processing said probing data.

6. The method of claim 5, wherein said pool of mobile devices comprises mobile devices for which location and movement is not under control of said probing system.

7. The method of claim 6, wherein said pool of mobile devices comprises mobile devices selected from the group consisting of:
   wireless telephones;
   personal digital assistants;
   pagers;
   personal computers;
   cameras;
   calculators;
   automobiles;
   aircraft; and
   free floating buoys.

8. The method of claim 5, wherein said selected ones of said mobile devices are selected at least in part upon being disposed at a position corresponding to said spatial aspects.

9. The method of claim 5, wherein said selected ones of said mobile devices are selected at least in part as having a likelihood of being disposed at a position corresponding to said spatial aspects.

10. The method of claim 5, wherein said selected ones of said mobile devices are selected based at least in part upon a class of said selected mobile devices.

11. The method of claim 5, wherein said spatial aspects are based at least in part upon spatial coordinates.

12. The method of claim 5, wherein said spatial aspects are based at least in part upon a region of interest with respect to said probing.

13. The method of claim 5, wherein said spatial aspects are based at least in part upon a proximity to another reference.

14. The method of claim 5, wherein said processing said probing data comprises spatial processing to account for uncertainty in spatial location with respect to particular ones of said selected mobile devices providing said probing data.

15. The method of claim 5, wherein said processing said probing data comprises temporal processing to account for uncertainty in temporal properties of said probing data with respect to particular ones of said selected mobile devices providing said probing data.

16. The method of claim 5, wherein said processing said probing data comprises statistical augmentation of said probing data as provided by responding ones of said selected mobile devices.

17. The method of claim 5, wherein said processing said probing data comprises utilizing interpolation models.

18. The method of claim 5, wherein said communicating probing data comprises a particular one of said selected mobile devices communicating at least a portion of said probing data at a point in space removed from a point in space where said particular one of said selected mobile devices collected said probing data.

19. The method of claim 5, wherein said configuring selected ones of said mobile devices for said desired probing activity comprises:
 empowering one or more said mobile devices to exhibit a level of autonomy with respect to probing activity thereof.

20. The method of claim 19, wherein said empowering one or more said mobile devices comprises:
 providing control code to facilitate said one or more mobile devices deciding when to perform a measurement action based on the mobile devices ability to make an accurate measurement.

21. A computer program product having a computer readable medium having computer program logic recorded thereon for utilizing a pool of mobile devices in probing operations, said computer program product comprising:
 code operable at a probing host system for providing probe management;
 code operable at said probing host system for providing management of probing data;
 code operable at said probing host system for determining spatial aspects with respect to a desired probing operation and statistically predicting which mobile devices of said pool of mobile devices are expected to experience desired coverage with respect to said spatial aspects;
 code operable at said probing host system for downloading probing software to one or more selected mobile devices of said pool of mobile devices for configuring said one or more selected mobile devices for said probing operation as a function of the statistical prediction;
 code, operable upon one or more mobile devices of said pool of mobile devices and under control of said code providing probe management, for providing probing data to said probing data management code, wherein said one or more mobile devices comprise mobile devices for which location and movement is under control of a user thereof independent of said probing operations, and wherein said code for providing probing data comprises said probing software downloaded to said one or more mobile devices by said probing host system.

22. The computer program product of claim 21, wherein said code for probe management comprises code for probe for controlling download/configuration of said mobile devices and code for controlling data acquisition by said mobile devices.

23. The computer program product of claim 21, wherein said code for providing management of said probing data comprises code for spatially processing probing data, code for temporally processing probing data, code for statistically augmenting probing data, and code for interpolating probing data using models.

* * * * *